United States Patent [19]
DeLaet

[11] Patent Number: 5,132,354
[45] Date of Patent: Jul. 21, 1992

[54] SILICON NITRIDE PRECURSOR POLYMER

[75] Inventor: Dru L. DeLaet, Baton Rouge, La.

[73] Assignee: Ethyl Corporation, Richmond, Va.

[21] Appl. No.: 538,744

[22] Filed: Jun. 15, 1990

[51] Int. Cl.$^5$ ............................................... C08K 3/34
[52] U.S. Cl. .................................... 524/442; 528/10; 528/31; 528/39; 524/443; 524/428; 423/344; 423/347; 423/324
[58] Field of Search .................. 528/10, 31, 39; 423/344, 347, 324; 524/443, 428, 442

[56] References Cited

U.S. PATENT DOCUMENTS

| | | | |
|---|---|---|---|
| 4,397,828 | 8/1983 | Seyferth et al. | 423/344 |
| 4,720,532 | 1/1988 | Seyferth et al. | 528/28 |
| 4,818,611 | 4/1989 | Arai et al. | 428/364 |
| 4,869,854 | 9/1989 | Takeda et al. | 528/39 |

FOREIGN PATENT DOCUMENTS 0242188 10/1987 European Pat. Off. .

Primary Examiner—Melvyn I. Marquis
Attorney, Agent, or Firm—Patricia J. Hogan

[57] ABSTRACT

Preceramic polysilazanes which (1) are composed of silicon, nitrogen, and hydrogen, (2) can be isolated and redissolved in common organic solvents, and (3) are capable of providing a high ceramic yield when pyrolyzed are prepared by reacting a mixture of one molar proportion of a tetrahalosilane, preferably tetrachlorosilane, and at least 4.5 molar proportions of a dihalosilane, preferably dichlorosilane, in an organic solvent. Ceramics obtained from the polysilazanes are nanoporous, amorphous silicon nitride ceramics having high purity.

14 Claims, No Drawings

//5,132,354//

SILICON NITRIDE PRECURSOR POLYMER

FIELD OF THE INVENTION

This invention relates to a novel silicon nitride precursor and to a process for preparing it.

BACKGROUND

As disclosed in U.S. Pat. No. 4,720,532 (Seyferth et al.-I), it is known that silicon nitride precursor polymers have many uses which make it desirable for them to be soluble in at least some organic solvents, as well as to be capable of providing a high ceramic yield when pyrolyzed.

Various techniques have been used to prepare silicon nitride precursor polymers, including the reaction of ammonia with certain silanes which may be defined as follows:

| | |
|---|---|
| dihalosilanes | $SiH_2X_2$ |
| dihalodisilanes | $Si_2H_4X_2$ |
| trihalosilanes | $SiHX_3$ |
| alkyltrihalosilanes | $RSiX_3$ |
| alkyldihalosilanes | $RSiHX_2$ |
| tetrahalosilanes | $SiX_4$ |

However, these known techniques lead to the formation of precursor polymers which have certain disadvantages. For example:

(A) Seyferth et al.-I, who prepare their precursors by subjecting a mixture of 20-1 molar proportions of an alkyldihalosilane and 1-20 molar proportions of a trihalosilane or alkyltrihalosilane to coammonolysis in an organic solvent, obtain polysilazanes which provide ceramics containing a substantial amount of carbon, as do Arai et al. (U.S. Pat. No. 4,818,611), whose precursors are prepared by the ammonolysis of one or more dihalosilanes or dihalodisilanes in an organic solvent;

(B) Seyferth et al.-II (U.S. Pat. 4,397,828), who prepare their polysilazanes by reacting a dihalosilane with ammonia in an organic solvent, form precursors which are unstable at room temperature and provide ceramics containing excess silicon; and (C) Crosbie et al. (European patent application 0 242 188), who react a tetrahalosilane vapor with liquid ammonia, form products which are limited in their use because of their intractability.

What is still needed are silicon nitride precursors which: (1) have a chemical composition such as to make them capable of providing a high yield of silicon nitride ceramic that is substantially free of carbon, excess silicon, and/or oxygen and consequently could be expected to have improved electrical properties and, (2) also have the advantage of being tractable polymers that can be easily processed when used to form molding compositions, coating compositions, fibers, infiltrants, etc.

Such polymers should be soluble in common organic solvents and would most desirably be stable at room temperature so that they could be isolated from their reaction mixtures, stored at room temperature, and then redissolved in the desired solvents. Moreover, although higher molecular weight oils having such characteristics might be desired for such applications as injection molding, it would also be desirable for other applications to provide solids having such properties.

SUMMARY OF THE INVENTION

It has now been found that preceramic polysilazanes which (1) are composed of silicon, nitrogen, and hydrogen, (2) can be isolated and redissolved in common organic solvents, and (3) are capable of providing a high ceramic yield when pyrolyzed can be prepared by reacting ammonia with a mixture of one molar proportion of a tetrahalosilane and at least 4.5 molar proportions of a dihalosilane in an organic solvent.

It has also been found that control of the dihalosilane/tetrahalosilane mol ratio within the range of 4.5-5.5/1 permits the formation of polysilazanes which are stable at room temperature and also leads to the formation of polymers which are solid.

Ceramics provided by these polysilazanes are nanoporous, amorphous silicon nitride ceramics that are at least substantially free of carbon and excess silicon and have a purity of at least 99.5%.

DETAILED DESCRIPTION

The tetrahalosilane and dihalosilane used in the practice of the invention are compounds corresponding to the formulas $SiX_4$ and $SiH_2X_2$ wherein X is fluorine, chlorine, bromine, or iodine, preferably chlorine. It is important that they be employed in the proper proportions in order to form polymers having suitable molecular weights and Si/N ratios. Moreover, it has been found that the use of too small an amount of the dihalosilane results in the formation of totally insoluble polysilazanes, while the use of too large an amount results in the formation of polymers which lose their ability to be redissolved after being stored at room temperature. Thus, the dihalosilane/tetrahalosilane mol ratio in the reaction mixture must be at least 4.5 and is preferably 4.5-5.5, most preferably 5/1.

The particular solvent in which the tetrahalosilane/dihalosilane mixture is dissolved is not critical as long as it satisfies the usual criteria for reaction mixture solvents, i.e., that it be liquid under the reaction conditions and inert to the reactants and reaction products. Solvents which are apt to be preferred are ethers such as tetrahydrofuran, 1,4-dioxane, diethyl ether, 1,2-dimethoxyethane, and 2-methoxyethyl ether; and aliphatic and aromatic hydrocarbons such as pentane, hexane, heptane, benzene, toluene, and xylene. However, as already mentioned, other inert solvents or mixtures thereof can also be used.

The reaction of ammonia with the mixture of tetrahalosilane and dihalosilane is typically effected in the same manner as in known ammonia/halosilane reactions, i.e., by bubbling an excess of ammonia through a solution of the tetrahalosilane/dihalosilane mixture in an oxygen- and moisture-free inert atmosphere at a suitable temperature. When the reaction is conducted without added pressure, it is important to use a temperature which is lower than the normal boiling point of any ingredient of the reaction mixture. However, the utilization of superatmospheric pressure permits the use of higher temperatures when desired.

During the reaction, which is exothermic, an ammonium halide precipitates; and the product can be easily separated from the precipitate, filtered, and dried to isolate the desired polysilazane product. This product can then be stored and/or shipped; redissolved in a suitable solvent, such as those mentioned above; and combined with any other ingredients appropriate for the formation of the desired molding composition, coating composition, infiltrant, fibers, or other product, after which the solvent may be removed when appropriate, e.g., prior to the molding of a molding composition or after application of a coating composition. The ingredients with which polysilazanes are commonly combined in the preparation of such compositions, e.g., silicon, aluminum, zirconium, and titanium nitride, carbide, and oxide powders and fibers; other ceramic powders and fibers; plasticizers; etc., are already well known to those skilled in the art.

When the polysilazanes or compositions containing them are to be pyrolyzed, they may be pyrolyzed by conventional techniques, typically by heating them at 675°-2000° C. in the absence of moisture or other source of active hydrogen. They may be pyrolyzed in ammonia if desired. However, unlike the prior art polysilazanes which have to be pyrolyzed in ammonia to reduce contamination by converting excess silicon to silicon nitride, the polysilazanes of the present invention do not contain a sufficient amount of excess silicon to require the use of ammonia during pyrolysis.

The invention is advantageous in that it provides novel polysilazanes which are soluble and capable of providing a high yield of silicon nitride ceramic when pyrolyzed and which, in preferred embodiments, are solid and/or stable at room temperature.

Ceramics prepared from the polysilazanes themselves, including, e.g., fibers and coatings, are nanoporous, amorphous silicon nitride ceramics which, unless intentionally modified to incorporate other elements, such as oxygen, have a purity of at least about 99.5% and which generally have densities in the range of about 1.9-2.8 g/cc.

Ceramics prepared from mixtures of the polysilazanes and other materials are also attractive, especially those in which the polysilazanes are mixed with silicon nitride powders, e.g., compositions containing about 15-50% by weight of the polysilazane and about 50-85% by weight of the powder. The ceramics prepared from the polysilazane/silicon nitride molding compositions are also nanoporous, amorphous silicon nitride ceramics which have a purity of at least about 99.5% unless they are intentionally modified to incorporate other elements; and the preferred ceramics have densities in the range of about 2-3 g/cc and bending strengths of at least about 35 kg/mm$^2$, more preferably at least about 40 kg/mm$^2$.

The following examples are given to illustrate the invention and are not intended as a limitation thereof. Each of the experiments described in these examples is one conducted in an inert atmosphere in a stirred reaction vessel which is flushed with nitrogen for several hours prior to being charged.

EXAMPLE I

5.2/1 Mol Ratio

Charge 635g of tetrahydrofuran to a suitable reaction vessel and cool to −20° C. While stirring at 500 rpm, condense 36.92 g of dichlorosilane into the tetrahydrofuran under vacuum and add 12.02 g of tetrachlorosilane by syringe. Then bubble ammonia into the solution at a rate of about 400 cc/minute, initially causing the pressure to increase to about 69 kPa and the temperature to rise to −13° C.

Continue adding ammonia for two hours to allow the reaction to proceed with the precipitation of ammonium chloride. At this point the amount of ammonia consumed is 35.75 g and the pressure has risen to 0.2 MPa, but the temperature has dropped to −20° C. Allow the reaction mass to warm to room temperature overnight while stirring. The pressure increases to slightly above 0.3 MPa. Transfer the solution to an inert atmosphere box, filter, and vacuum-strip the filtrate to dryness.

The reaction results in a 97% isolated yield of ammonium chloride and a 74.3% isolated yield of a soluble polysilazane which gives a ceramic yield of 90% by TGA (25°-1000° C. at 10°/minute).

EXAMPLE II

5/1 Mol Ratio

Charge 2 kg of tetrahydrofuran to a suitable reaction vessel under a slight vacuum and cool to −30° C. While stirring at 300 rpm, condense 162.4 g of dichlorosilane into the tetrahydrofuran under vacuum and add 55.04 g of tetrachlorosilane by syringe. Then transfer ammonia to the closed reactor at a rate of about 700 cc/minute, initially causing the pressure to increase to about 69 kPa and the temperature to rise to −20° C.

Continue adding ammonia for four hours to allow the reaction to proceed with the precipitation of ammonium chloride. At this point the amount of ammonia consumed is about 124 g. Increase the agitation to take up another 10 g of ammonia, while the temperature drops to −30° C. Allow the reaction mass to warm to room temperature overnight while stirring. The pressure increases to 0.48 MPa. Transfer the solution to an inert atmosphere box, filter, and vacuum-strip the filtrate to dryness.

The reaction results in a 97% isolated yield of ammonium chloride and a 76.5% isolated yield of a soluble polysilazane, about 5% of which becomes insoluble after isolation.

EXAMPLE III

5.5/1 Mol Ratio

Follow the same general procedure as in Example II except for using 184.6 g of dichlorosilane and 56.5 g of tetrachlorosilane. The reaction results i a polysilazane yield greater than 90%. Immediately after isolation, the polymer is resoluble in organic solvents. It also remains tractable when stored at −50° C. However, after being stored at room temperature for 24 hours, it becomes insoluble.

COMPARATIVE EXAMPLE A

3.7/1 Mol Ratio

Follow the same general procedure as in Example II except for using 120.8 g of dichlorosilane and 54.8 g of tetrachlorosilane. When isolated, the bulk of the polysilazane product becomes insoluble.

COMPARATIVE EXAMPLE B

2/1 Mol Ratio

Charge 500 mL of tetrahydrofuran to a suitable reaction vessel and cool to −20° C. Condense 6.4 g of dichlorosilane into the tetrahydrofuran and add 5.38 g of tetrachlorosilane by syringe. Bubble ammonia into the resultant solution at a rate of about 75 cc/minute, and continue the exothermic reaction for 4-6 hours with the precipitation of ammonium chloride. Transfer the solution to an inert atmosphere box, filter, and vacuum-strip the filtrate to dryness. Less than 1% of the polysilazane product is soluble, and TGA (25°-1000° C. at 10°/minute) shows a ceramic yield of only about 86%.

EXAMPLE IV

8.1/1 Mol Ratio

Follow the same general procedure as in Comparative Example B except for using 38.5 g of dichlorosilan and 8.0 g of tetrachlorosilane. The isolated polysilazane is a thermally-sensitive oil which becomes intractable after being stored at room temperature for 24 hours.

IR spectra of the polysilazanes prepared in each of the examples and comparative examples described above show them to be ammonolysis products with no contamination.

EXAMPLE V

Coating Application

Dissolve an aliquot of the polysilazane of Example II in toluene to form a 20% solution. Coat the solution onto a graphite surface, dry the preceramic coating, and pyrolyze it to a ceramic.

Examination of the ceramic coating shows it to be free of cracks, in contrast to the cracked coating obtained when a ceramic coating is prepared under identical conditions except for the use as the polysilazane of a polysilazane prepared essentially in accordance with the teachings of Seyferth et al.-III (U.S. Pat. No. 4,482,669).

EXAMPLE VI

Molding Application

Prepare a mixture of silicon nitride powder and the polysilazane of Example II in a weight ratio of 3/1 by adding the silicon nitride powder to a solution of the polysilazane, flashing off the majority of the solvent, vacuum-drying the residue, pulverizing it, and sieving to provide a molding composition having a particle size not larger than about 105 micrometers. Mold the composition into green discs, and pyrolyze the discs under nitrogen. Test the bending strengths of the discs by the biaxial-loading- stress method described in Godfrey, *Materials Science & Technology*, Vol. 1, No. 7 (1985), pp. 510–515.

The test shows the discs to have an average bending strength of 43.1 kg/mm$^2$, in contrast to the average bending strength of only 31.6 kg/mm$^2$ determined when ceramic discs are prepared under identical conditions except for the use as the polysilazane of a polysilazane prepared essentially in accordance with the teachings of Seyferth et al.-III.

The improved bending strength obtained by the use of a polysilazane of the invention in the molding composition is surprising, since known silicon nitride ceramics obtained from polysilazane molding compositions have had an increase in purity accompanied by a decrease in bending strength. For example, when the composition which provides ceramic discs having the aforementioned average bending strength of 31.6 kg/mm$^2$ is converted to ceramic discs in the same manner except for being pyrolyzed under ammonia instead of nitrogen to increase the silicon nitride purity, the discs have an average bending strength of only 7.0 kg/mm$^2$.

What is claimed is:

1. A soluble preceramic polysilazane composed of silicon, nitrogen, and hydrogen and prepared by reacting ammonia with a mixture of one molar proportion of a tetrahalosilane and at least 4.5 molar proportions of a dihalosilane in an organic solvent.

2. The polysilazane of claim 1 which is stable at room temperature.

3. The polysilazane of claim 1 which is a solid prepared from a mixture of one molar proportion of the tetrahalosilane and 4.5–5.5 molar proportions of the dihalosilane.

4. The polysilazane of claim 3 which is stable at room temperature.

5. The polysilazane of claim 4 prepared from a mixture of one molar proportion of the tetrahalosilane and five molar proportions of the dihalosilane.

6. The polysilazane of claim 3 wherein the tetrahalosilane is tetrachlorosilane and the dihalosilane is dichlorosilane.

7. A solution in an organic solvent of a polysilazane of claim 3.

8. A process which comprises reacting ammonia with a mixture of one molar proportion of a tetrahalosilane and at least 4.5 molar proportions of a dihalosilane in an organic solvent to form a soluble preceramic polysilazane composed of silicon, nitrogen, and hydrogen.

9. The process of claim 8 wherein the amount of dihalosilane is 4.5–5.5 molar proportions.

10. The process of claim 9 wherein the amount of dihalosilane is five molar proportions.

11. The process of claim 9 wherein the tetrahalosilane is tetrachlorosilane and the dihalosilane is dichlorosilane.

12. The process of claim 8 wherein the preceramic polysilazane is isolated from the reaction mixture after the reaction has been completed.

13. The process of claim 12 wherein the isolated preceramic polysilazane is redissolved in an organic solvent to form a solution.

14. A molding composition comprising a mixture of a polysilazane of claim 1 and silicon nitride powder.

* * * * *